Dec. 30, 1930.  C. ABSMEIER  1,786,726
BOARD CUTTING MACHINE
Filed Feb. 6, 1929   3 Sheets-Sheet 3
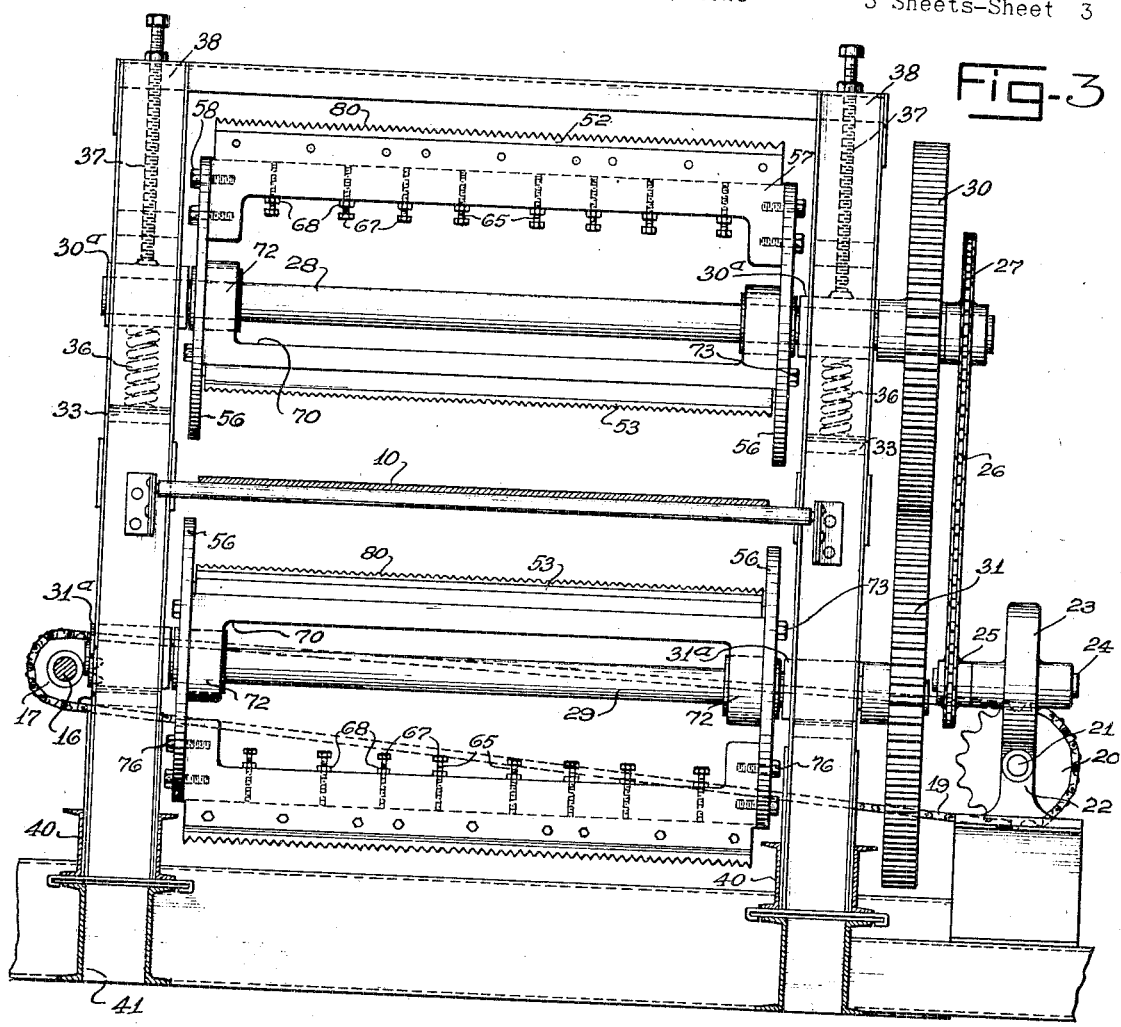
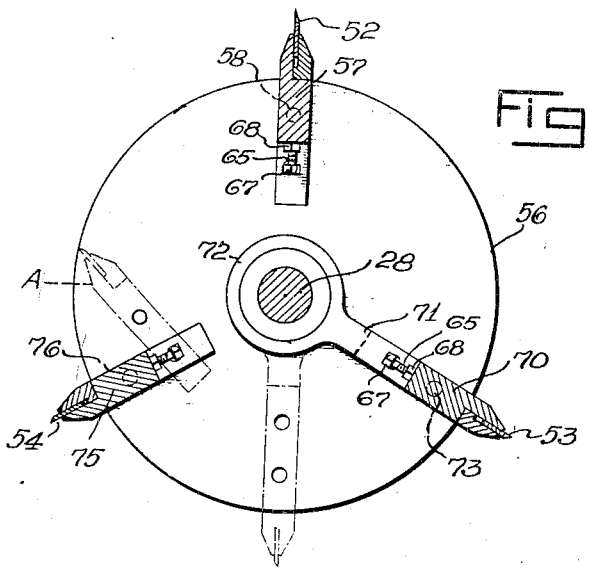
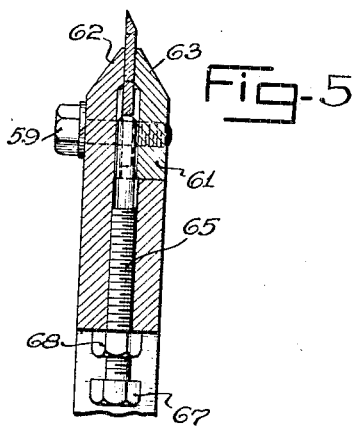
INVENTOR
CARL ABSMEIER.
BY
ATTORNEY

Patented Dec. 30, 1930

1,786,726

UNITED STATES PATENT OFFICE

CARL ABSMEIER, OF MAYWOOD, ILLINOIS, ASSIGNOR TO UNITED STATES GYPSUM COMPANY, OF CHICAGO, ILLINOIS, A CORPORATION OF ILLINOIS

BOARD-CUTTING MACHINE

Application filed February 6, 1929. Serial No. 337,748.

This invention relates to cutting devices and has reference more particularly to a cutting machine for cutting a moving and continuous sheet of material, such as gypsum board, into predetermined lengths.

Plasterboard is usually manufactured on a continuous belt machine in which upper and lower cover sheets are spaced apart and bonded together by means of a cementitious core material such as gypsum. The gypsum is applied to the cover sheets in a plastic state and quickly sets to a hard material which contains a considerable amount of moisture, and this moisture must be dried out by passing the gypsum board through a drying kiln. If the gypsum boards are cut into rather small pieces before going through the drying kiln, the pieces are apt to become overlapping on passing through the drying kiln and cause blockades with a consequent shut-down of the machinery. In order to avoid this condition it is desirable to cut off the gypsum boards completely in rather long lengths and between the ends of said board, perforate same so that after passing through the drying kiln, the boards may be easily broken apart manually to the finished lengths.

An object of this invention, therefore, is to provide a cutting machine which is suitable for cutting boards into rather long lengths and for perforating the boards intermediate the ends thereof.

Another object of this invention is to provide a cutting machine where the knives are readily adjustable for perforating and also for cutting boards of different lengths; also to improve cutting machines in other respects hereinafter specified and claimed.

Figure 1:
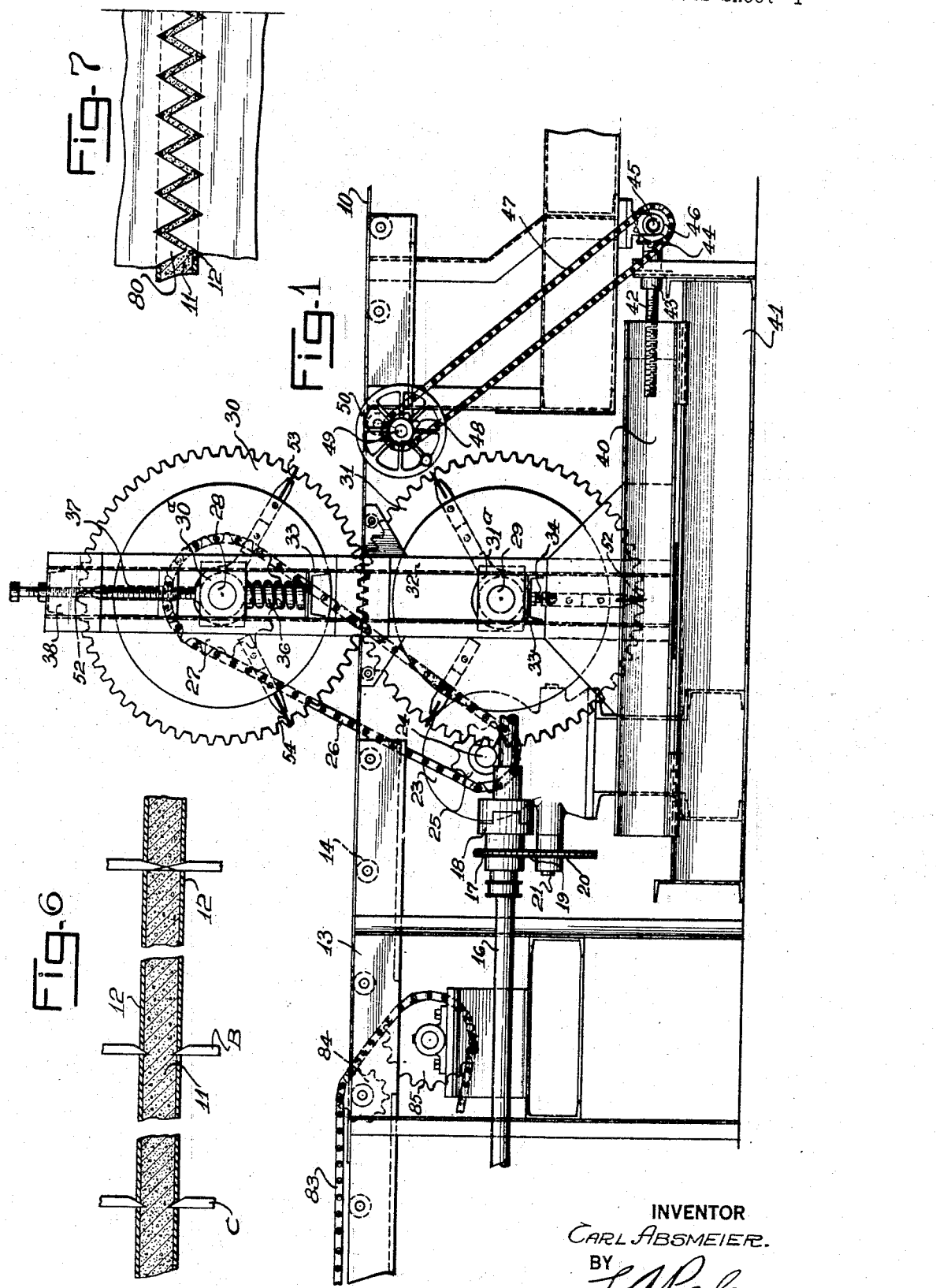
Figure 2:
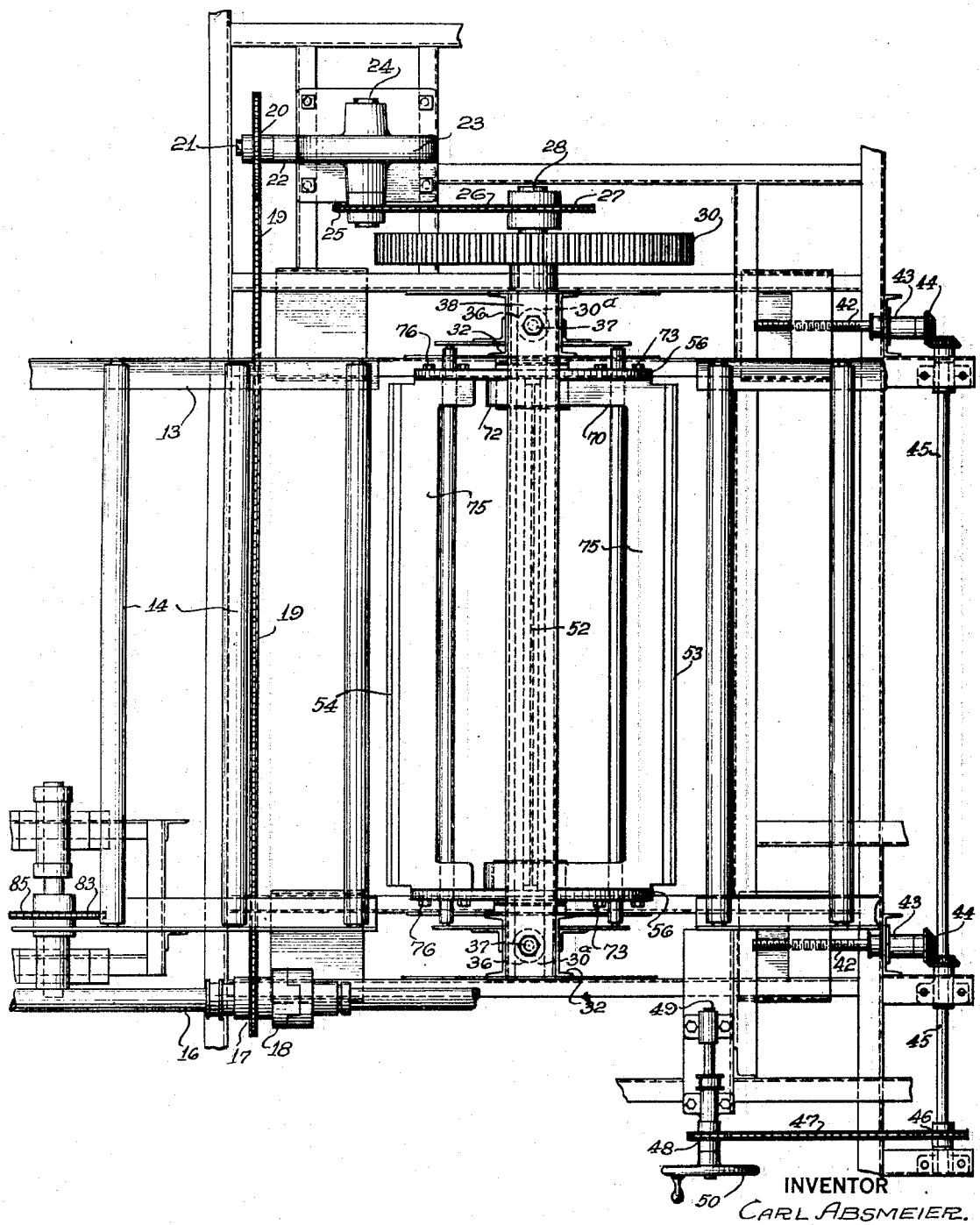

Reference is to be had to the accompanying drawings forming a part of this specification in which Fig. 1 is a side elevation of my improved cutting machine, Fig. 2 is a plan view of the cutting machine, Fig. 3 is a sectional end elevation of the cutting machine, Fig. 4 is a transverse sectional elevation of one of the cutting devices, Fig. 5 is a sectional view on a large scale through one of the cutting knives, Fig. 6 is a sectional elevation showing a plurality of knives for cutting and perforating, and Fig. 7 is a fragmentary elevation of a pair of the cutting knives in cutting position.

The plasterboard 10 is usually formed with a cementitious core material 11 of gypsum having paper cover sheets 12 on each face thereof. This plasterboard is formed from plastic gypsum material in a manner well known to the art, and passes in a continuous sheet along a roller conveyor 13 having rollers 14 for supporting the plasterboard during its travel. The cutting machine of the present invention is designed to cut this continuous sheet of plasterboard into predetermined lengths during the movement thereof, and to perforate the plasterboard at intermediate points so that it may be readily broken up into smaller pieces after passing through the drying kiln. A power shaft 16 extends longitudinally of the roller conveyor 13 and is connected to other operating mechanism of the plasterboard machine, being driven by any suitable source of power, such as a motor not shown.

My improved cutting machine may be driven by any suitable gearing from said power shaft e. g. by a sprocket wheel 17 rotatably mounted on said shaft and provided with a clutch 18 which may be used for disconnecting or connecting said sprocket wheel to the shaft 16. A chain 19 leads from sprocket wheel 17 to a sprocket wheel 20 secured to a shaft 21, the latter being rotatably mounted in bearing bracket 22. Secured to the shaft 21 is a worm, not shown, contained in a worm housing 23, the latter also containing a worm wheel which is secured to a worm wheel shaft 24. A sprocket wheel 25 is secured to the shaft 24 and is connected by a chain 26 to a sprocket wheel 27 which is secured on a cutter shaft 28. A cutter shaft 29 is positioned below the cutter shaft 28 and said cutter shafts 28 and 29 are geared together by means of gears 30 and 31 respectively.

The shafts 28 and 29 are rotatably mounted in bearing blocks 30d and 31d respectively, said blocks being adjustable vertically, and being slidably mounted in any suitable way such as upon vertical guides or standards 32. Cross beams 33 are provided between standards 32 and in connection with the lower shaft 29 and an adjusting screw 34 passes through the beam 33 so as to adjust the vertical position of the bearing block 31d and shaft 29. The upper cross beam 33 may support a spring 36 which bears on the underside of bearing block 30d and holds said block in contact with the lower end of an adjusting screw 37, the latter being adjustably supported in blocks 38 secured to the upper ends of standards 32. The lower ends of standard 32 are secured upon a suitable sliding base 40 which is slidably supported upon sub-base 41. One end of the sliding base 40 is threaded to receive a screw 42, the latter being rotatably received in bearing 43 secured to the sub-base 41. The outer end of screw 42 may be provided with a bevel gear 44 meshing with a similar bevel gear on a countershaft 45 and said shaft is provided with a sprocket wheel 46 connected by chain 47 to a sprocket wheel 48 on a hand-wheel shaft 49. A hand-wheel 50 is secured to the shaft 49 so that by turning said wheel, the entire base 40 and cutting mechanism may be adjusted longitudinally of the machine to any desired position.

One of the salient features of my invention lies in the cutting mechanism itself, which is so constructed as to also perforate the board at intervals as shown in Fig. 6. Thus, as a continuous gypsum board sheet travels along the conveyor 13 it is engaged by cutting knives 52, 53 and 54 which are mounted to rotate with shaft 28, and similar cutting knives are mounted to rotate with shaft 29 and are exactly synchronized with the knives on shaft 28. A pair of discs 56 is secured to the shaft 28 and the knife 52 is removably secured in a bracket 57, which is secured by bolts 58 to said discs. Bolts 59 pass through the bracket 57, the outer ends of said bolts being threaded to engage a tapped hole in a knife holder plate 61. The cutting knives are thus gripped between the jaws 62 and 63 formed on the bracket 57 and plates 61 respectively. The bracket 57 has a tapped hole adapted to adjustably receive a special bolt 65, the end of said bolt engaging the inner edge of the cutting knife adjacent thereto. The bolt 65 has a head 67 for the application of a wrench in adjusting the position of the knife and is also provided with a lock nut 68 of usual construction for locking the bolt in any adjusted position.

The bracket 70 for supporting the cutting knife 53 is preferably U shaped as shown in Fig. 2, and is provided with radially extending arms 71 having a bearing 72 formed on the inner ends thereof adapted to rotatably engage the shaft 28. Lock bolts 73 pass through the discs 56 and engage the arms 71 so as to secure the knife 53 in a plurality of positions relative to knife 52, such as in the dot-and-dash position shown in Fig. 4. A bracket 75 for supporting the knife 54 is adjustably secured to discs 56 by bolts 76 so that said knife may be entirely removed from the machine or may be bolted to said discs in dot-and-dash A position as shown in Fig. 4 where the knife 54 will not engage the plasterboard during the rotation of discs 56.

Each of the knives 52, 53 and 54 is provided with saw teeth 80 along the cutting edges thereof, said saw teeth being adapted to enter the paper cover sheets 12 of the plasterboard with a cutting effect so as to pierce the paper without tearing same. The speed of rotation of the cutting knives is so adjusted by the gearing that said cutting knives travel at a speed equal to that of the plasterboard along the roller conveyor 13. Since the vertical position of shafts 28 and 29 is adjustable, the knives 52, 53 and 54 may be adjusted to either cut off, as shown in Fig. 7 or to only perforate, as shown in positions B and C of Fig. 6. Thus, the continuous sheet of plasterboard may be cut off every 12′ and perforated every 4′ so as to make it possible for the operator to break the board in three separate 4′ lengths after same has passed through the drying kiln. In keeping the pieces connected during their travel through the drying kiln, the danger of blocking the tunnel through the drying kiln is entirely overcome since the boards are much less apt to become jammed up. Any suitable conveyor may be provided to deliver the continuous plasterboard onto the roller conveyor 14, such as a chain conveyor 83 which is movably supported upon sprocket wheels 84 and 85.

In operation, the continuous sheet of plasterboard 10 moves along roller conveyor 13 between the cutting knives 52, 53 and 54, supported on shaft 28 and similar cutting knives supported upon shaft 29. The cutter knives 52, 53 and 54 are adjusted at any desired radial distance from the center of rotation by means of adjusting screws 65 so that one of said knives, such as 52, may cut off the board while the remaining knives 53 and 54 only perforate the board so that it can later be broken apart manually after passing through the drying kiln. Cutter shafts 28 and 20 are geared together by means of gears 30 and 31 and are rotated from power shaft 16 through sprocket 17, chain 19, sprocket 29, wormwheel shaft 24, sprocket 25, chain 26 and sprocket 27. The position of the cutting knives longitudinally of the conveyor 13 is adjusted by moving sliding base 40 by means of screw 42, bevel gears 44, shaft 45, sprocket 46, chain 47, sprocket 48 and hand-wheel 50.

While the foregoing description sets forth a certain embodiment of my invention, I do not wish to limit myself precisely to these details since manifestly the same can be considerably varied without departing from the spirit of the invention as defined in the appended claims.

Having thus described my invention, I claim as new and desire to secure by Letters Patent:

1. In a cutting machine, means for advancing a continuous strip of sheet material, a shaft rotatably supported adjacent said sheet material, a plurality of cutting knives adjustably supported on said shaft, means for adjusting the position of one of said knives circumferentially with reference to a second knife and means for rotating said shaft so that said knives operate on said sheet material.

2. In a cutting machine, the combination with a conveyor adapted to continuously advance a strip of gypsum board, of cutting means rotatably mounted adjacent said board so as to cut said board into predetermined lengths, and means for adjusting the position of said cutting means longitudinally of said strip of board.

3. In a cutting machine, a conveyor adapted to continuously advance a continuous strip of gypsum board, a shaft rotatably mounted adjacent the face of said board, a plurality of cutting knives secured to each shaft, means for permitting the movement of one of said knives into inoperative position, and means for rotating said shaft so that said board is cut into predetermined lengths.

4. In a cutting machine, means for advancing a continuous strip of gypsum board having paper cover sheets separated by a cementitious core, a shaft carrying cutting knives rotatably mounted near each face of said board, one of said cutting knives on each of said shafts being adjusted to substantially sever the board while another knife on the same shaft is adjusted to only perforate the cover sheets thereof, and means for rotating said shaft and knives in synchronized relation.

CARL ABSMEIER.